Dec. 19, 1939.  G. M. DEMING  2,183,709

DOUBLE-ACTING CHECK VALVE

Original Filed Jan. 12, 1933

INVENTOR
George M. Deming
BY
ATTORNEY

Patented Dec. 19, 1939

2,183,709

UNITED STATES PATENT OFFICE 2,183,709

DOUBLE-ACTING CHECK VALVE

George M. Deming, East Orange, N. J., assignor to Air Reduction Company, Incorporated, New York, N. Y., a corporation of New York Original application January 12, 1933, Serial No. 651,249. Divided and this application October 16, 1936, Serial No. 105,874

7 Claims. (Cl. 48—38)

This invention relates to valves for automatically checking excessive outflow and all back flow through a fluid supply line. The invention can be employed with liquids but finds its principal use in gas lines, and especially in the outlet connections of an acetylene generator.

In the operation of acetylene generators conditions conducive to a flashback are brought about by back flow of oxygen from a torch into the acetylene line. Even with excessively high oxygen pressure, such mixing of the acetylene and oxygen is limited to the immediate vicinity of the torch if back flow of gas in the line is prevented by a check valve.

It is also advantageous to prevent excessive outflows of gas from the generator. If a hose bursts, or through some other accident most of the resistance to gas outflow is removed, the immediate shutting off of the gas may save an explosion or fire at the region where the gas is escaping. Another situation in which a check on a sudden increase or heavy flow increases safety is when an explosion in the generator itself causes an excessive pressure rise which would be transmitted through the service line before the gas could escape through the relief valve.

It is an object of this invention to provide an improved valve structure which checks all back flow through a line and which closes in response to sudden increases and excessive rates of outflow. In combination with the outlet connections of an acetylene generator the valve greatly reduces the hazards of generator operation.

In accordance with one feature of the invention the construction is such that the valve element for checking back flow can not be closed at the same time as the valve element for preventing sudden or excessive outflow. This construction makes it impossible for the valve elements to seal the space between them with a reduced pressure in that space so that the external pressure will keep both valve elements closed.

This application is a division of my application Serial No. 651,249, filed January 12, 1933, now Patent No. 2,085,084, dated June 29, 1937.

Other objects, features and advantages of the invention will appear or be pointed out as the specification proceeds.

In the accompanying drawing, forming part hereof:

Figure 1:
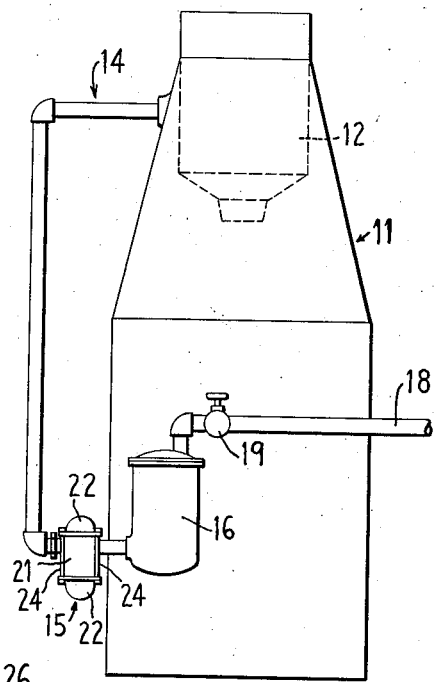
Fig. 1 is a diagrammatic side elevation showing an acetylene generator equipped with a valve embodying this invention.

Fig. 1 shows a generator 11 having a hopper 12 from which carbide is dropped into water in the tank below. The gas formed is stored in the upper portion of the generator which serves as a gas storage tank and from which the gas flows through outlet piping 14 and through the valve 15 to a water-seal flash-arrester 16. After bubbling through the water in the flash-arrester 16, the gas flows into a supply or service line 18 commanded by a cut-off valve 19.

The valve 15 includes a housing comprising a body portion 21 and upper and lower covers 22 clamped to the body portion by bolts 24. A partition 25 divides the interior of the housing into an upper chamber 26 and a lower chamber 28. Gas enters the lower chamber through an inlet 30 to which the piping 14 of the generator is connected. The upper chamber 26 has a threaded outlet 32 which connects with the flash-arrester 16.

The partition 25 has an opening 34 with lips 35 and 36 at its upper and lower ends, respectively. An upper valve element 38 includes a disk 39 which clamps a seat 40, of soft rubber or other suitable material, against a casting 42 which is of square cross-section and has studs 44 in sliding contact with the side of the opening 34. The disk 39 is clamped against the seat 40 by a screw 45 threading into the casting 42.

Figure 2:
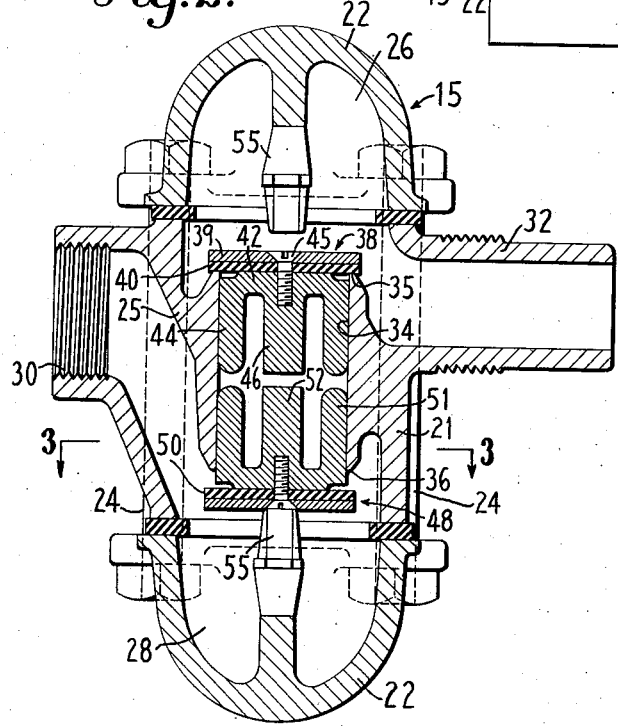
Fig. 2 is an enlarged vertical sectional view of the valve shown in Fig. 1.
Figure 3:
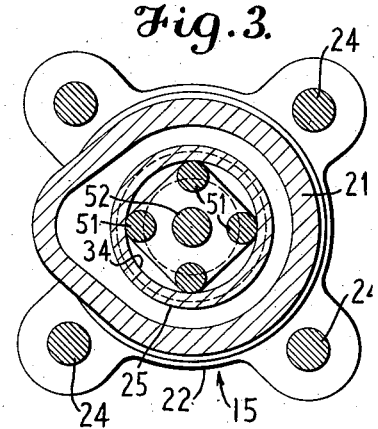
Fig. 3 is a horizontal sectional view taken on the line 3—3 of Fig. 2.

The valve element 38 has a central stud 46, the purpose of which will be explained hereinafter. The disk 39 and seat 40 are of greater diameter than the opening 34 so that the seat contacts with the the lip 35 when the valve element 38 is in closed position, as shown in Fig. 2.

A lower valve element 48 is of similar construction to the upper valve element 38 and has a seat 50 which contacts with the lip 36 when this lower valve element is in closed position.

The lower valve element has studs 51 in sliding contact with the side of the opening 34, and has a central stud 52 directly under the central stud 46 of the upper valve element. The length of the central studs 46 and 52 is such that it is impossible for both of the valve elements 38 and 48 to be in closed position at the same time. In Fig. 2, the upper valve element 38 is shown in closed position and the lower valve element in open position. If the lower valve element moves upward into closed position, however, its central stud 52 will strike the central stud 46 of the upper valve element and lift the upper valve element into open position.

Thus, the central studs 46 and 52 prevent the two valve elements 38 and 48 from being closed against the lips at the same time and the lower valve element failing to drop open, under the influence of gravity, because of no vent to the space between the valve elements.

The opening of the valve elements 38 and 48 is limited by stops 55 on the inner sides of the covers 22. Both of the covers 22 are of identical construction to facilitate manufacturing, but the shape chosen is determined by the requirements of the lower cover. There is considerable space under the lower valve element 48 so that lime sludge which sometimes gets into the casing will not interfere with the free movement of the lower valve element. The lower stop 55 limits the opening movement of the valve element 48 to such a displacement from the lip 36 that a sudden increase in the flow of gas around this valve element, or a gas flow of high velocity, causes this lower valve element 48 to move up against the lip 36 and stop further outflow. Thus, the flow of gas from the generator is automatically cut off if it becomes excessive as the result of a broken line or one which has been carelessly left without proper fittings, or if an explosion occurs within the generator.

The particular conditions of gas flow necessary to cause the lower valve element 48 to move into closed position are determined by the weight of the valve elements, by the cross-sectional area of the opening 34, and by the amount of displacement of the seat 50 from the lip 36. The design of the double-acting check valve depends upon the service for which the generator is intended and the quantity of gas which it is to deliver.

The upper valve element 38 prevents water in the flash-arrester 16 from being forced out of the flash-arrester and through the piping connecting the generator with the flash-arrester. Water may be forced back out of a flash-arrester when oxygen at excessive pressure is supplied to a torch connected with the supply line 18, or when the generator is purged and its pressure drops below that existing in the supply line.

Although the flash-arrester 16 is the first line of defense against flashbacks, the upper valve element serves as a second line of defense, and experience has shown that this upper valve element 38 is effective to stop flashbacks in the event that the flash-arrester has been drained and through some error not refilled before putting the generator into operation.

The invention is not limited to the construction shown in the drawing and changes and modifications can be made without departing from the invention as defined in the claims.

I claim:

1. A double-acting check valve comprising a housing, a gas inlet and outlet for the housing, a partition across the inside of the housing between the inlet and outlet, an upwardly extending passage through the partition, valve means at opposite ends of the passage for controlling the flow of gas through the passage, said valve means including an upper check valve element having a stud portion slidable in the passage and a seat portion overlying the upper end of the passage and adapted to block the flow of gas downward into the passage, and another check valve element at the lower end of the passage having a stud portion extending upward into the passage and a seat portion extending across the lower end of said passage, the combined length of the studs being slightly greater than the length of said passage so that the studs interfere and prevent both valve elements from being in closed positions at the same time, and an abutment limiting the displacement of the lower check valve element from the end of the passage to such a distance that a sudden increase in the rate of flow or a rate in excess of a given value raises the lower check valve element into a position to close the passage.

2. A double-acting check valve including a housing having inlet and outlet openings, a partition in the housing between said openings, the partition having a passage extending upward toward the outlet side of said partition, two check valve elements, one at each end of the passage and each constructed and arranged to cover the adjacent end of the passage and close the passage against the flow of gas in one direction, each of said check valve elements having a central stud extending into the passage toward the other check valve element, the combined length of the studs of both valve elements being greater than the length of the passage so that the central studs prevent both valve elements from being in closed position at the same time, and an abutment for limiting the opening of the check valve element at the lower end of the passage.

3. The combination with an acetylene generator having outlet piping, a water-seal flash-arrester, and a service line into which gas flows from the flash-arrester, of a double-acting check valve connected in the piping between the generator and the flash-arrester, said valve comprising one valve element constructed and arranged to act as a check valve against back flow from the flash-arrester toward the generator, and a second valve element that limits the outflow of gas from the generator, said second valve element being normally open and constructed and arranged to close in response to a sudden increase in the rate of flow toward the flash-arrester or a velocity of flow above a given value.

4. Apparatus for controlling the supply of gas from an acetylene generator including a passage through which all of the gas flows on its way to a service line, valve seats at opposite ends of the passage, a normally-closed valve element cooperating with the valve seat at the service line end of the passage to prevent back flow of gas from the service line into the passage, another valve element normally spaced from the valve seat at the generator end of the passage with sufficient clearance to permit a given flow of gas into the passage, but constructed and arranged to close against the seat and stop all flow of gas into the passage from the generator end of said passage in the event of a sudden increase in the rate of flow or a rise in the gas velocity above a given maximum.

5. The combination with an acetylene generator of a valve casing through which the gas passes on its way from the generator to a service line, a partition in the valve casing, the partition having an upwardly extending opening with valve seats at opposite ends of the opening, a check valve located at the upper end of the opening and urged by gravity against the upper seat to prevent back flow of gas from the service line to the generator, said valve being of such a nature that it opens readily in response to pressure from the generator, a valve element at the lower end of the passage normally held open by gravity, an abutment limiting the downward movement of the lower valve element to such a displacement from the valve seat that it will be raised against the valve seat by the energy of the gas stream if the rate of flow increases suddenly or exceeds a given maximum, and means for causing one valve element to move into open position when the other moves into closed position.

6. In a gas supply apparatus of the class wherein acetylene gas is generated in a tank under pressure and forced by such pressure through a check valve which closes to prevent return flow, and into a service line which supplies the gas to the users, the combination with said check valve of another valve in series with the check valve and of such a nature that in closed position it blocks all flow of gas from the generator through the check valve, said other valve being normally open but constructed and arranged to be moved into closed position by the kinetic energy of the gas stream when the rate of flow of gas from the generator becomes excessive.

7. An acetylene generator system wherein gas flows from a generator through valve apparatus to a service line, characterized by the fact that there is combined in the valve apparatus a conduit, a valve seat in the conduit, a normally open valve element constructed and arranged to contact with said seat and close the conduit against the outflow of gas when the rate of flow increases suddenly or exceeds a given velocity, another valve element constructed and arranged to serve as a check valve to prevent back flow of gas through the conduit, and means to prevent the valve elements from remaining in closed position at the same time.

GEORGE M. DEMING.